(12) United States Patent
Zhang et al.

(10) Patent No.: US 8,943,578 B2
(45) Date of Patent: *Jan. 27, 2015

(54) METHOD AND APPARATUS FOR FAST CHECK AND UPDATE OF ANTI-REPLAY WINDOW WITHOUT BIT-SHIFTING IN INTERNET PROTOCOL SECURITY

(71) Applicant: Futurewei Technologies, Inc., Plano, TX (US)

(72) Inventors: Xiangyang Zhang, San Jose, CA (US); Xiaoyong Yi, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,069

(22) Filed: May 28, 2013

(65) Prior Publication Data

US 2013/0269022 A1 Oct. 10, 2013

Related U.S. Application Data

(63) Continuation of application No. 13/089,735, filed on Apr. 19, 2011, now Pat. No. 8,474,034.

(51) Int. Cl.
*G06F 21/00* (2013.01)
*H04L 29/06* (2006.01)
(52) U.S. Cl.
CPC ........ *H04L 63/0227* (2013.01); *H04L 63/1466* (2013.01); *H04L 63/164* (2013.01)
USPC .................. 726/13; 726/14; 726/26; 713/175; 709/227; 709/228; 380/44; 705/75; 455/410

(58) Field of Classification Search
CPC .................................................... H04L 63/1466
USPC ............................................................ 726/13
See application file for complete search history.

(56) References Cited

U.S. PATENT DOCUMENTS

| | | | | |
|---|---|---|---|---|
| 6,953,120 | B2 * | 10/2005 | Deveau et al. | 209/10 |
| 6,978,384 | B1 * | 12/2005 | Milliken | 726/26 |
| 7,237,262 | B2 * | 6/2007 | Lahti et al. | 726/13 |
| 7,571,343 | B1 | 8/2009 | Xiang et al. | |
| 8,185,795 | B1 * | 5/2012 | Krigovski et al. | 714/752 |
| 2004/0202110 | A1 * | 10/2004 | Kim | 370/235 |

(Continued)

OTHER PUBLICATIONS

Kent, S., et al., "Security Architecture for the Internet Protocol," RFC 2401, Nov. 1998.

(Continued)

*Primary Examiner* — Morshed Mehedi
(74) *Attorney, Agent, or Firm* — Conley Rose, P.C.; Grant Rodolph; Brandt D. Howell (57) ABSTRACT

An apparatus comprising a processor configured to implement an anti-replay check for a plurality of received packets and a plurality of corresponding sequence numbers; and a circular buffer coupled to the processor and comprising a bitmap, wherein the bitmap is slid in a circular manner by updating a low index that points to a first sequence number for a first received packet and a high index that points to a last sequence number for a last received packet without bit-shifting, and wherein, when the update results in the new value of one of the low index and the high index exceeding the end of the circular buffer, the one of the low index and the high index wraps around from the beginning of the circular buffer.

12 Claims, 5 Drawing Sheets

(56) References Cited

U.S. PATENT DOCUMENTS

2005/0195850 A1* 9/2005 Matsumoto et al. .......... 370/428
2008/0288872 A1* 11/2008 Burkley et al. ............... 715/723
2009/0245290 A1* 10/2009 Moonen ........................ 370/503

OTHER PUBLICATIONS

Kent, S., "IP Authentication Header," RFC 4302, Dec. 2005.
Kent, S., "IP Encapsulating Security Payload (ESP)," RFC 4303, Dec. 2005.
Kent, S., et al., "Security Architecture for the Internet Protocol," RFC 4301, Dec. 2005.
Kent, S., et al., "IP Authentication Header," RFC 2402, Nov. 1998.
Kent, S., et al., "IP Encapsulating Security Payload (ESP)," RFC 2406, Nov. 1998.
Zhang, Y., "A Multilayer IP Security Protocol for TCP Performance Enhancement in Wireless Networks," IEEE Journal on Selected Areas in Communications, vol. 22, No. 4, May 2004, pp. 767-776.

* cited by examiner

METHOD AND APPARATUS FOR FAST CHECK AND UPDATE OF ANTI-REPLAY WINDOW WITHOUT BIT-SHIFTING IN INTERNET PROTOCOL SECURITY

CROSS-REFERENCE TO RELATED APPLICATIONS

The present application is a continuation of U.S. patent application Ser. No. 13/089,735 filed Apr. 19, 2011 by Xiangyang Zhang et al. and entitled "Method and Apparatus for Fast Check and Update of Anti-Replay Window Without Bit-shifting in Internet Protocol Security," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Due to the widespread use of data networks to communicate a variety of information, data security has become a concern. Confidential information on a private network may be accessed and/or intercepted by unauthorized parties when connected to an untrusted network, e.g., the Internet. A suite of Internet Protocol Security (IPSec) protocols defined by the Internet Engineering Task Force (IETF) is designed to provide secure communications over the Internet via data encryption. In the IPSec protocols, such as Authentication Headers (AH) and Encapsulating Security Payload (ESP), a sequence number is communicated and used to protect against a replay attack. In a replay attack, an attacker or adversary copies an intercepted packet and replays the information or packet to one or both parties to obtain confidential information from a party. Anti-replay algorithms are designed to effectively distinguish between actual replay attacks and out-of-order packets caused by various network conditions. For example, packets may arrive out of order due to parallel processing inside routers, splitting traffic among multiple links with different delays, and/or route change with different end-to-end delay. ESP/AH implements an anti-replay sliding window protocol to secure against an adversary inserting messages or replayed packets into a secure communication channel.

SUMMARY

In one embodiment, the disclosure includes an apparatus comprising a processor configured to implement an anti-replay check for a plurality of received packets and a plurality of corresponding sequence numbers; and a circular buffer coupled to the processor and comprising a bitmap, wherein the bitmap is slid in a circular manner by updating a low index that points to a first sequence number for a first received packet and a high index that points to a last sequence number for a last received packet without bit-shifting, and wherein, when the update results in the new value of one of the low index and the high index exceeding the end of the circular buffer, the one of the low index and the high index wraps around from the beginning of the circular buffer.

In another embodiment, the disclosure includes a network component comprising a receiver configured to receive a plurality of packets and a plurality of corresponding sequence numbers; and a logic circuit configured to maintain a bitmap that comprises a plurality of bits and a low index and a high index for the bitmap and to increment both the low index and the high index by an integer number of bits when a packet is received that has a sequence number greater than the high index, wherein the bits in the bitmap are not shifted; and wherein when incrementing one of the low index and the high index by the integer number of bits results in a value exceeding end of the bitmap, the one of the low index and the high index wraps around from the start of the bitmap.

In a third aspect, the disclosure includes a method comprising receiving a packet, obtaining a sequence number from the packet, dropping the packet if the sequence number is smaller than a low index, authenticating the packet if the sequence number is greater than or equal to the low index and less than or equal to a high index, and sliding an anti-replay window bitmap by updating the low index and the high index without bit-shifting the anti-replay window bitmap if the sequence number is greater than the high index.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In anti-replay schemes, a sequence number may be used to protect against a replay attack. A sender may assign a sequence number to each sent packet, e.g., an Internet Protocol (IP) packet. For instance, a sequence number of about one may be associated with a first packet, a sequence number of about two may be associated with a second packet, etc. A receiver may verify that the sequence number of a received packet is not identical to the sequence number of a previously received packet. In case a duplicate sequence number is detected, the corresponding duplicate packet may be dropped. The receiver may maintain an anti-replay window in the form of a bitmap to authenticate each received packet and determine if the sequence number was previously received. The bit location of each bit in the bitmap may indicate a sequence number of a packet as an offset with respect to a low index. For example, if the value of the low index is equal to about 33, a seventh bit location in the bitmap may indicate a sequence number of about 39. The value of a bit in the bitmap may be set to indicate whether a packet with a sequence number associated with the location of the bit has already been received and authenticated. The bitmap may also be associated with a high index that indicates the sequence number of the last checked packet. For example, if the value of the high index is equal to about 64, then a 64-th packet may be the last received and authenticated packet in a sequence of packets.

The window size or number of bits in the bitmap may be determined based on an expected maximum difference or offset between the sequence numbers of out-of-order packets. For example, if the difference between sequence numbers of two consecutively received out-of-order packets is at most about 255, then the window size may be set to be about 256, and hence the bitmap may comprise about 256 bits. A packet associated with a sequence number lower than the value of the low index may be a duplicate packet and may be dropped. A packet associated with a sequence number greater than the value of the high index may trigger a bit-shifting of the window or bitmap. In case the received packet is associated with a sequence number between the low index value and the high index value, the bits in the bitmap may be checked for authentication. The packet may be rejected as a replay packet if the bit at a location within the bitmap associated with the sequence number of the packet is previously set, e.g., to about one. Otherwise, the corresponding bit may be set and the packet is authenticated.

The rapid growth of number of mobile users and higher bandwidth demands may require high-speed IPSec applications that implement a substantially large anti-replay window size. For example, a hardware (or chip) vendor may implement a sliding or bit-shifted window of about 128 bits. Some vendors, such as Cisco, may enable a consumer to configure an anti-replay window size of about 1,024 bits. In cases where packets arrive in order, the entire window may be shifted for each received packet, e.g., when the sequence number of the packet is greater than the high index. In the case of a relatively large window, bit-shifting operations may be power and time consuming.

Disclosed herein is a system and a method for implementing a relatively fast anti-replay check where an anti-replay window may be updated using additional redundant bits. The window may be updated using a circular buffer by updating a high index and a low index without a bit-shifting procedure, which may be efficient for substantially large size windows. The frequency of window updates may be reduced by adding redundant bits to the bitmap and combining a plurality of updates into one update. Further, the bit location in the bitmap may be mapped to a sequence number independently of the low index in the bitmap, which may simplify the bit checking procedure.

Figure 1:
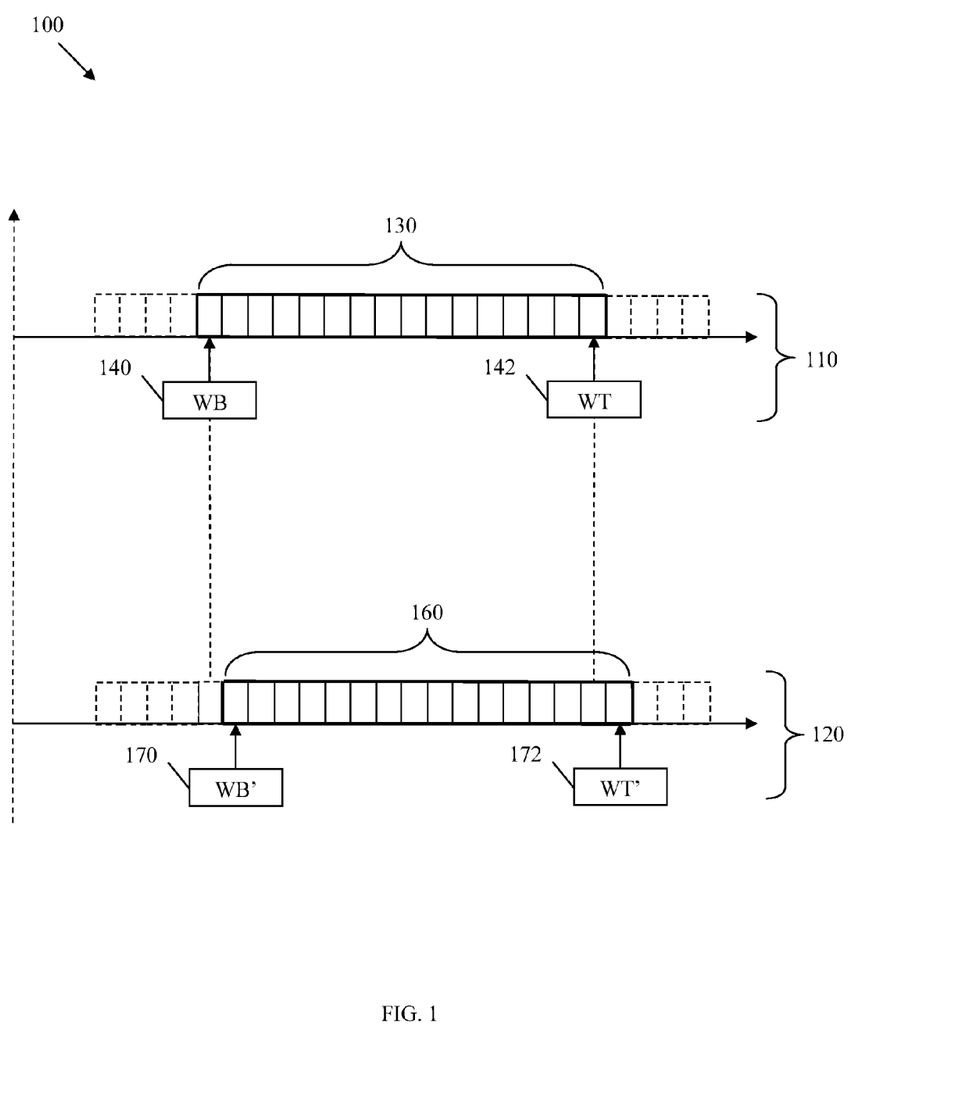
FIG. 1 is a schematic diagram of an embodiment of a typical bitmap processing scheme.

FIG. 1 illustrates an embodiment of a typical bitmap processing scheme 100. The bitmap processing scheme 100 may be used by a network component or node to implement an anti-replay algorithm, e.g., based on a sliding or bit-shifting window scheme as described in the IETF Request for Comments (RFC) 2401, which is incorporated herein by reference. The bitmap processing scheme 100 may comprise a window 110 and a shifted window 120. A window corresponds to a bitmap. The bitmap may comprise a plurality of bits, where the number of bits in the window represents the window size. A window may also be associated with a low index and a high index, e.g., which may be maintained in memory. The window 110 may comprise a plurality of bits 130, and may be associated with a low index 140 and a high index 142. The shifted window 120 may comprise a plurality of shifted bits 160 and may be associated with an updated low index 170 and an updated high index 172. The low index 140, the high index 142, the updated low index 170, and the updated high index 172 may each point to a location of a bit in their respective windows. The values of the low index 140 and the high index 142 may be referred to as window bottom (WB) and window top (WT), respectively. The values of the updated low index 170 and the updated high index 172 may be referred to as updated WB (WB') and updated WT (WT'), respectively. WB, WT, WB', and WT' may be integers. WB and WT may point to the bottom and top bit location, respectively, of the window 130, and WB' and WT' may point to the bottom and top bit locations, respectively, of the shifted window 120. The number of bits 130 in the window 110 may be equal to the number of shifted bits 160 in the shifted window 120. The components of the bitmap processing scheme 100 may be arranged as shown in FIG. 1.

In the bitmap processing scheme 100, the window 110 may be updated by the shifted window 120 if a new and valid packet that is received has a sequence number greater than the high index 142. The location of the window 110 may initially be determined by WB and WT. After shifting, the location of the shifted window 120 may be determined by WB' and WT'. The window 110 may be shifted by at least one bit location to obtain the shifted window 120. The value of a bit in the bitmap may indicate an authentication status, e.g., whether or not a packet with a sequence number corresponding to the bit location has been received. For example, if a bit is set to about one, then a packet associated with a sequence number S, that corresponds to the bit location may have been previously received, and thus may be a replay packet.

Specifically, upon receiving a packet, the receiver may extract S from the packet. If S is less than WB (S<WB), then the packet may have been previously received and may be dropped. If S is within the window 110, e.g., if the value of S is less than or equal to about WT and is greater than or equal to about WB (WB≤S≤WT), then the bit at the location in the bitmap that corresponds to S may be set. The bit location that corresponds to S may be mapped based on S and WB using the operation (S−WB) & (bits in the window), wherein "&" indicates an AND bit operation and "bits in the window" indicates the total number of bits in the window or bitmap. If the bit at the bit location is not set, e.g., is equal to about zero, then the packet may be a delayed packet received out of order, e.g., after the packet received with the highest sequence number. The bit at the bit location may then be set, e.g., to about one. Alternatively, if the bit at the bit location was previously set, then the packet may be a replayed packet. If S is greater than WT (S>WT), then the packet may be received in order after the packet with the last sequence number. Thus, the window 110 may be shifted (to the right) by about S−WB bits to obtained the shifted window 120. The low index 140 and the high index 142 may also be updated to obtain the updated low index 170 and the updated high index 172, respectively. As such, WB' may be equal to about S and WT' may be equal to about WB+S−T. After the bit-shifting procedure, the shifted bits 160 in the shifted window 120 may all be set to about zero, e.g., to indicate that no packets with sequence numbers corresponding to the shifted bit locations have been received yet.

The window size may be set based on a plurality of considerations. For example, the window size may be based on an estimate of a maximum difference in sequence numbers of out of order packets that may be received. The algorithm described in the RFC 2401 recommends a minimum window size of about 32 bits or about 64 bits. For relatively small window sizes, the algorithm described in the RFC 2401 may employ hardware parallelism to enable real-time processing, such as a plurality of shift registers or a relatively large shift register combined with multiple memory accesses. In the case of a substantially high traffic rate, for example a rate of about 50 Gigabits per second (Gbps) using a high-end multi-core network processor, a relatively large window size may be used. For instance, some vendors, such as Cisco or Juniper, may use a window size of up to about 1,024 bits. In one scenario where IP packets arrive in order, substantially high frequency of updates and bit shifts may be needed using the bitmap processing scheme 100, which may have substantial cost. Additionally, the number of memory accesses may increase, e.g., in a linear manner, for larger window sizes. Thus, using a relatively large window for relatively high data rates may not be efficient.

Figure 2:
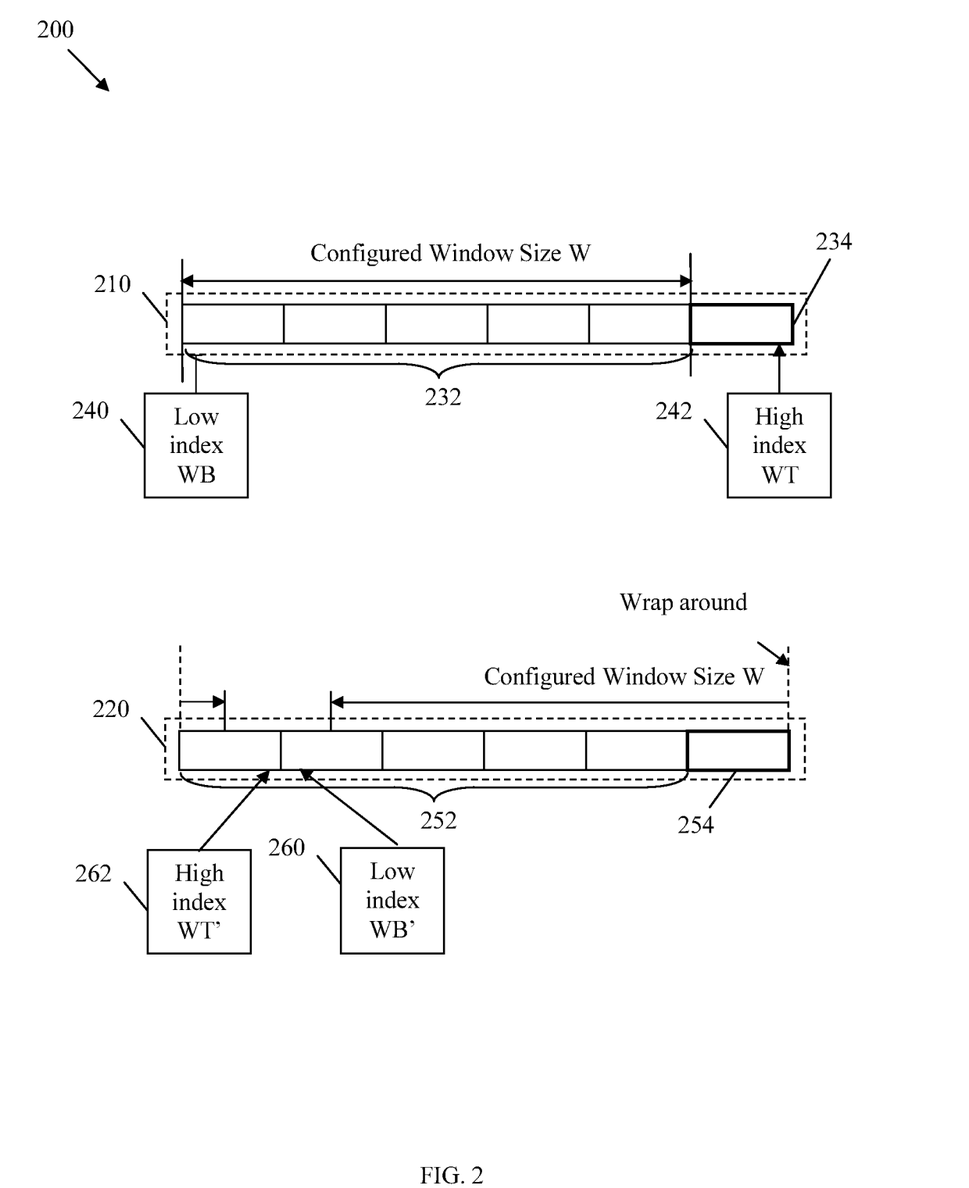
FIG. 2 is a schematic diagram of an embodiment of an improved bitmap processing scheme.

FIG. 2 illustrates an embodiment of an improved bitmap processing scheme 200 that may be used in a network component or node to implement an anti-replay algorithm. The bitmap processing scheme 200 may comprise a window 210 and an updated window 220. The window 210 may comprise a bitmap of a plurality of bit blocks 232, which may be about equal to a maximum expected allowed difference in sequence numbers of out-of-order packets, and a redundant bit block 234. The bit blocks 232 and the redundant bit block 234 may comprise about the same quantity of bits, e.g., about 32 bits or about 64 bits. The quantity of bit blocks 232 may determine a configured window size W, e.g., which may correspond to the size of the window 110 and the updated window 120. The total quantity of bit blocks 232 and the redundant bit block 234 may determine an actual window size, W+1, which may correspond to a circular buffer size for implementing the bitmap processing scheme 200. The window 210 may also be associated with a low index 240 and a high index 242. The low index 240 may point to a bit location within the window 210 that corresponds to a first sequence number, e.g., of about one, for a first packet in a sequence of sent packets. The high index 242 may point to a bit location in the window that corresponds to a last sequence number of a last received and authenticated packet in the sequence of packets. The updated window 220 may comprise a bitmap of a plurality of second bit blocks 252 and a second redundant bit block 254. The updated window 220 may also be associated with an updated low index 260 and an updated high index 262. The number of bits in each bit block, N, or the block size may be substantially identical. The updated window 220 may be an updated bitmap of the window 210 and thus may occupy the same circular buffer, e.g., in memory. Accordingly, the second bit blocks 252, the second redundant bit block 254, the updated low index 260, and the updated high index 262 may be updated elements of the bit blocks 232, the redundant bit block 234, the low index 240, and the high index 242, respectively. In some embodiments, the block size may be equal to about a multiple power of two in bits, e.g., about eight bits or about 32 bits.

In the bitmap processing scheme 200, the window 210 may be updated into the updated window 220 in a circular buffer, where the bits may represent a ring of bit locations or sequence that may be shifted in a circular manner by updating the low and high index values instead of implementing a bit-shift procedure as used in the bitmap processing scheme 100. As such, the values of the low index 240 (e.g., WB), the high index 242 (e.g., WT), the updated low index 260 (e.g., WB'), and the updated high index 262 (e.g., WT') may be used to point to corresponding bit locations in a circular logic, where the values may wrap around the window or bitmap. Specifically, a pointer for each of the high index 242 and the low index 240 may be equal to the value of the index modulo the total quantity of the bits in the window or the bitmap, e.g., a product of the block size and the total number of blocks in the bitmap. Additionally, the sequence number S in a received packet may be wrapped to a bit location independent of the low index value (WB or WB') using the operation S&(bits in the window), as defined above.

Initially, a packet may be received and a sequence number S may be obtained from the packet. If S is greater than WT, which may be expected if packets arrive in order, then the low index 240 and the high index 242 may be updated by adding an integer N to each index (WB and WT) to obtain the updated low index 260 and the updated high index 262 (WB' and WT'). Thus, WT' may be equal to WT+N, and WB' may be equal to WB+N. The integer N may be about equal to the number of bits in each bit block, e.g., the block size. As shown in FIG. 2, the updated high index 262 may wrap around the updated window 220 and may point to a bit location that precedes the bit location indicated by the updated low index 260. After sliding or shifting the window as described above, about N bits in the bit locations corresponding to the range from WT'−N+1 to WT' may be reset or initialized, e.g., to about zero, and the remaining bits in the window may not be changed. Updating the window as such may only be implemented once for about N received packets in order, e.g., with consecutive sequence numbers. After updating the low and high indices, any received packets with sequence numbers within the range from WT'−N+1 to WT' may not trigger another window updated. Thus, the redundant N bits in the redundant block may allow combining a plurality of updates for about N received packets into one updated procedure, as described above.

Additionally, the bitmap processing scheme 200 may be faster and simpler to implement than the bitmap processing scheme 100 since the sequence number may be checked in the bitmap independent of the low index value. In one example of the bit map processing scheme 200, the configured window size may be equal to about 224 bits, e.g., about seven 32 bit blocks. The actual window may comprise the configured window and an additional 32-bit block. Thus, the actual window size may comprise about 256 bits. The actual window may be implemented using an array of about eight 32-bit size integers (e.g., unit 32 A[8]) using software. Initially, the low and high indices associated with the actual window may be equal to about zero and about 255, respectively. When a packet is received with a sequence number S greater than about 255, then a value of about 32 may be added to both the low index and the high index. For example, if S is equal to about 258, then each the low index and high index may be increased to about 32 and about 287, respectively. The updated low and high indices may still cover the configured window, e.g., at the bit locations that correspond to the range from about 35 to about 258. Subsequently, only the highest 32 bits in the window, e.g., that correspond to the bit range from about 256 to about 287 may be reset or initialized. For example, the highest 32 bits may correspond to the integer A[0] in the array.

When a packet is received with S between about 256 and about 287, the window may not require further updating since the configured window may still be within the actual window after sliding. In this scheme, checking a bit in the bitmap may be relatively simple since it is not based on the low and high indices. For instance, to check a bit, the bit location may be calculated as the lowest about eight bits of the sequence number, using the operation (S&0xFF). The index of the array may be obtained using the operation (S>>5)&3 and the bit location may be obtained from an integer in the array that corresponds to the index, which may be equal to about S&0x1F.

In the bit processing scheme 200, the difference between the sequence number and the high index (e.g., S−WT) may not be less than about the block size N. If the difference between S and WT is not less than the block size, then multiple blocks or N bits may be added to each of WB and WT. In this case, multiple blocks may then be initialized to update the window as described above using multiple blocks and as such may reduce the processing time for updating the window.

Further, different quantity of redundant bits may be used, e.g., in different embodiments. For instance, if an about 32-bit processor is used, an about 32-bit redundant block may be more suitable to implement than an about 64 bit block. The redundant block size may also depend on the size of the sliding window, e.g., the number of bits in the window. The size of the window may be a multiple power of about two to accelerate and/or simplify computations. If the redundant block comprises N bits (e.g., about 32 bits), then about 1/N-th the number of updates that are used in RFC 2401 may be needed in the improved scheme herein.

As described above, the bit processing scheme 200 may not require bit shifting to update the window. The hardware and/or software used to implement the scheme may update the high and low indices to slide the window but may not use bit shifting. The scheme may have an additional cost of the redundant block size, e.g., about one byte or multiple bytes in the window bitmap. The additional cost may be less significant as the size of the window increases. The redundant bits may not be wasted since the redundant bits may allow authenticating about N additional packets using a single window update. The additional packets' sequence numbers may be outside the range of the configured window but may still be within the range of the actual window.

Figure 3:
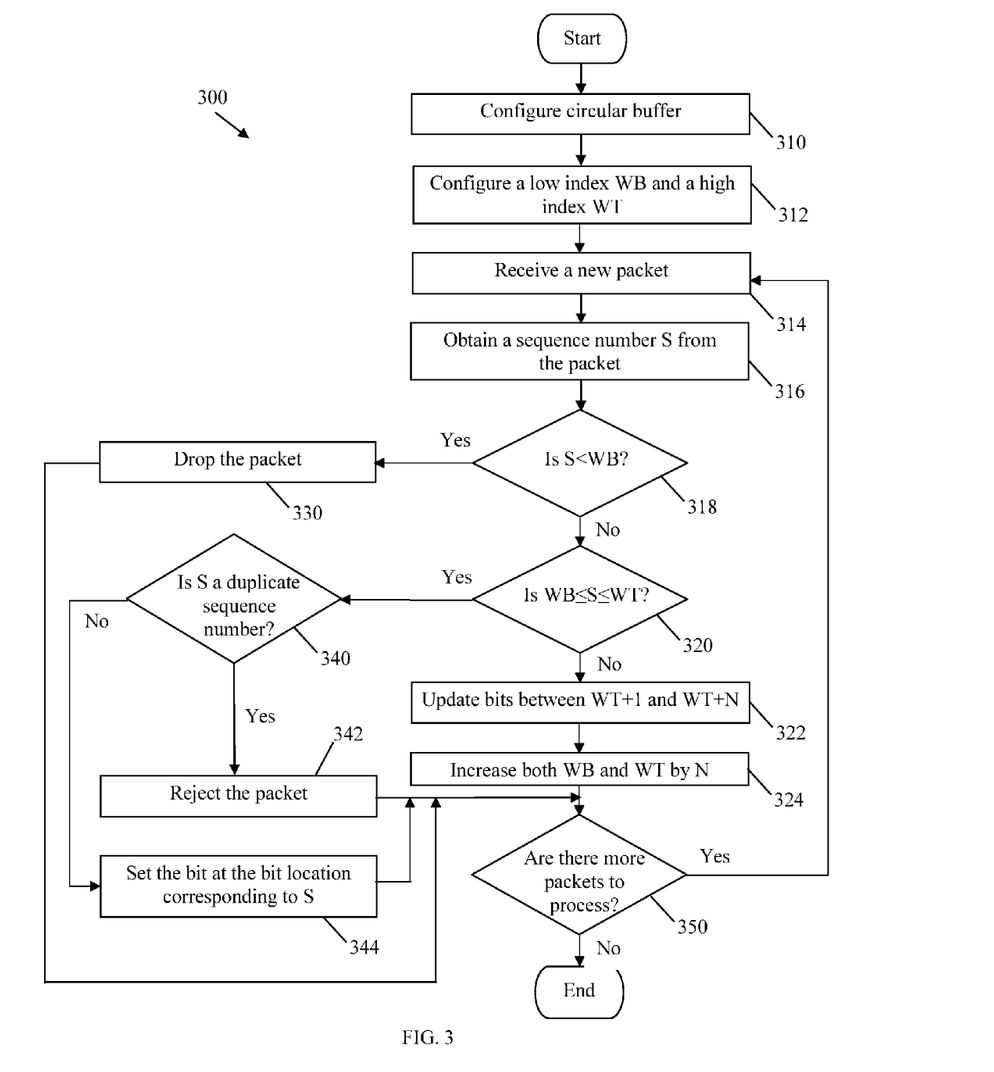
FIG. 3 is a flowchart of an embodiment of an improved bitmap processing method.

FIG. 3 illustrates an embodiment of an improved bitmap processing method 300, which may be implemented by a network component or node to update an anti-replay window. The method 300 may begin at block 310, where a circular buffer may be configured. The circular buffer may comprise a plurality of blocks of N bits, such as the bit blocks 232 and the redundant bit blocks 234 of the window 210. For instance, each block may comprise about a byte, about two bytes, or about four bytes. At block 312, a low index WB and a high index WT may be configured. The low index and the high index may be used to map a first bit location based on a first received sequence number and a last bit location based on a last received sequence number, respectively. At block 314, a new packet may be received. The packet may be an IP packet received from a sender during an Internet communication. At block 316, a sequence number S may be obtained from the packet. The sequence number may be assigned by the sender before sending the packet. At block 318, the method 300 may determine whether S is less than WB (S<WB). If the condition in block 318 is met, then the method 300 may proceed to block 330. Otherwise, the method may continue to block 320.

At block 320, the method 300 may determine whether S is greater than or equal to WB and is less than or equal to WT (WB≤S≤WT). If the condition in block 322 is met, then the method 300 may proceed to block 340. Otherwise, the method 300 may proceed to block 322. At block 322, the bits between WT+1 and WT+N may be updated. At block 324, both WB and WT may be increased by N, where N is the block size. For example, if a block comprises a byte, WB and WT may each be increased by about eight. At block 350, the method 300 may verify if there are more packets to process. If the condition in block 350 is met, then the method 300 may return to block 314. Otherwise, the method 300 may end.

At block 330, the packet may be dropped, e.g., since the packet may have been previously received and accounted for. The method 300 may then proceed to block 350. At block 340, the method 300 may determine whether S is a duplicate sequence number, e.g., that corresponds to a replay package. The packet may be a replayed or duplicate packet if the bit location that corresponds to S comprises a bit that is set. If the condition in block 340 is met, then the method 300 may proceed to block 342. Otherwise, the method 300 may proceed to block 344. At block 342, the packet may be rejected or dropped. The method 300 may then proceed to block 350. At block 344, the bit at the bit location corresponding to S may be set. As such, the packet may be authenticated. The method 300 may then proceed to block 350.

Figure 4:
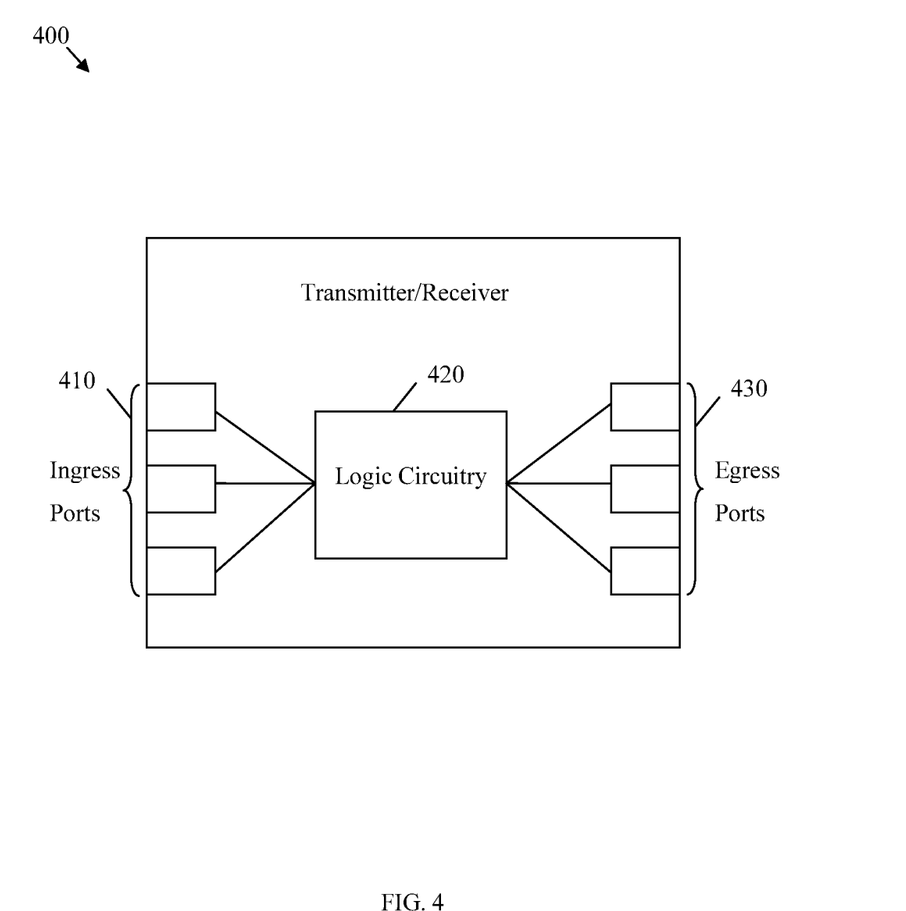
FIG. 4 is a schematic diagram of an embodiment of a transmitter/receiver unit.

FIG. 4 illustrates an embodiment of a transmitter/receiver unit 400, which may be any device that transports data through a network. The transmitter/receiver unit 400 may also implement the bit processing scheme 200 and/or the bit processing method 300. The transmitted/receiver unit 400 may comprise one or more ingress ports or units 410 for receiving sequences of data that comprise bits or words, logic circuitry 420 to perform transceiver data operations, and one or more egress ports or units 430 for transmitting the data to other network components. The logic circuitry 420 may also implement the improved anti-replay algorithm, as described above. For instance, the logic circuitry 420 may implement logic that updates the anti-replay window, as shown above.

Figure 5:
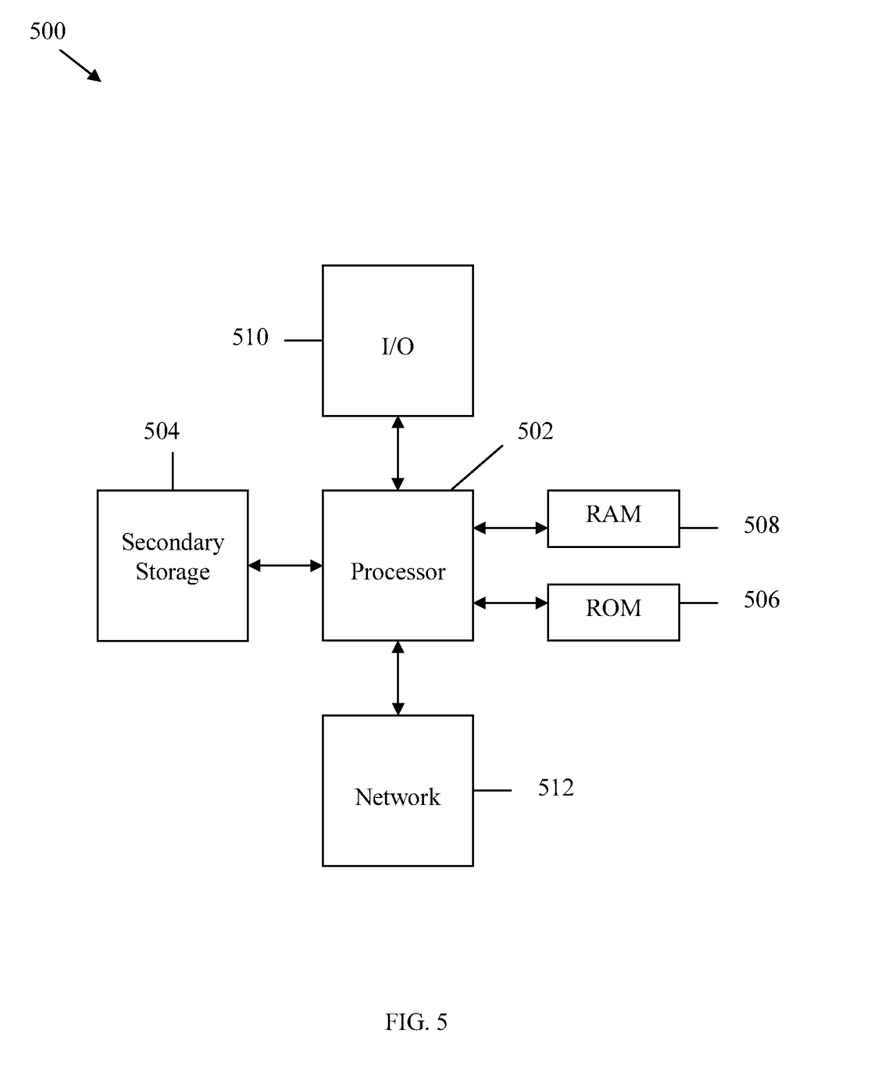
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more Application Specific Integrated Circuits (ASICs).

The secondary storage 504 is typically comprised of one or more disk drives or tape drives and is used for non-volatile storage of data and as an overflow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of using M blocks of memory, where each block contains N bits and M and N are positive integers, to update an anti-replay sliding window of (M−1)*N bits without bit shifting, wherein the anti-replay sliding window is defined by a low index and a high index, the method comprising:

receiving a packet with a sequence number greater than the high index;
add a difference between the sequence number and the high index to the high index and the low index to generate a new high index and a new low index;
determining the sequence number is in a first block beyond the block pointed to by the high index;
based on the determining:
  initializing all bits values in the first block to zero without bit shifting; and
  circularly shifting the new high index to point to the first block and update the anti-replay sliding window using the new high index and the new low index.

2. The method of claim 1, wherein the anti-replay sliding window comprises a bitmap, wherein a value of a bit in the bitmap is set to indicate whether a packet with a second sequence number associated with the location of the bit has already been received and authenticated.

3. The method of claim 2, further comprising:
subsequent to receiving the packet, receiving a second packet with the second sequence number, wherein the second sequence number is less than the new low index and greater than the new high index;
determining that the bit in the bitmap indicates that the second packet has already been received and authenticated; and
based on the indication that the second packet has already been received and authenticated, dropping the second packet.

4. The method of claim 3, wherein N is a power of two.

5. The method of claim 1, wherein the M blocks of memory is configured as a circular buffer.

6. The method of claim 1, wherein the anti-replay sliding window represents a string of bits, wherein the value of each bit in the string indicates whether or not a packet with the sequence number corresponding to the bit has been received and authenticated.

7. An apparatus for updating an anti-replay sliding window of (M−1)*N bits without bit shifting, wherein the anti-replay sliding window is defined by a low index and a high index, wherein the apparatus comprises:
a memory comprising M blocks, where each block contains N bits and M and N are positive integers;
a receiver configured to receive a packet with a sequence number greater than the high index;
a processor coupled to the receiver and the memory, wherein the processor is configured to:
add a difference between the sequence number and the high index to the high index and the low index to generate a new high index and a new low index;
determine the sequence number is in a first block beyond the block pointed to by the high index;
based on the determining:
  initialize all bits values in the first block to zero without bit shifting; and
  circularly shift the new high index to point to the first block and update the anti-replay sliding window using the new high index and the new low index.

8. The apparatus of claim 7, wherein the anti-replay sliding window comprises a bitmap, wherein a value of a bit in the bitmap is set to indicate whether a packet with a second sequence number associated with the location of the bit has already been received and authenticated.

9. The apparatus of claim 8, wherein the receiver is further configured to subsequent to receiving the packet, receive a second packet with the second sequence number, wherein the second sequence number is less than the new low index and greater than the new high index, and wherein the processor is further configured to:
- determine that the bit in the bitmap indicates that the second packet has already been received and authenticated; and
- based on the indication that the second packet has already been received and authenticated, drop the second packet.

10. The apparatus of claim 9, wherein N is a power of two.

11. The apparatus of claim 7, wherein the memory is configured as a circular buffer.

12. The apparatus of claim 8, wherein the anti-replay sliding window represents a string of bits, wherein the value of each bit indicates whether or not a packet with the sequence number corresponding to the bit has been received and authenticated.

* * * * *